(12) United States Patent
Lee et al.

(10) Patent No.: US 12,316,116 B2
(45) Date of Patent: May 27, 2025

(54) METHOD FOR PREDICTION POWER GENERATION USING META-LEARNING, DEVICE AND SYSTEM USING THE SAME

(71) Applicant: Encored Technologies, Inc., Seoul (KR)

(72) Inventors: Hyo Seop Lee, Seoul (KR); Chang Ho Shin, Gwangju (KR)

(73) Assignee: Encored Technologies, Inc., Seoul (KR)

( * ) Notice: Subject to any disclaimer, the term of this patent is extended or adjusted under 35 U.S.C. 154(b) by 0 days.

(21) Appl. No.: 18/829,033

(22) Filed: Sep. 9, 2024

(65) Prior Publication Data

US 2025/0125616 A1     Apr. 17, 2025

(30) Foreign Application Priority Data

Oct. 11, 2023   (KR) .......................... 10-2023-0135140

(51) Int. Cl.
*H02J 3/00*         (2006.01)
(52) U.S. Cl.
CPC ........... *H02J 3/004* (2020.01); *H02J 2203/20* (2020.01)
(58) Field of Classification Search
CPC .............................. H02J 3/004; H02J 2203/20
See application file for complete search history.

(56) References Cited

U.S. PATENT DOCUMENTS

| 2014/0039709 | A1* | 2/2014 | Steven | H02J 13/00034 700/291 |
| 2014/0316973 | A1* | 10/2014 | Steven | H02J 3/008 705/37 |
| 2020/0006944 | A1* | 1/2020 | Fife | H02J 3/004 |
| 2022/0108262 | A1* | 4/2022 | Cella | G01N 29/14 |
| 2022/0209574 | A1* | 6/2022 | Fife | H02J 3/008 |

FOREIGN PATENT DOCUMENTS

| JP | 2016-194478 A | 11/2016 |
| KR | 10-2020-0003490 A | 1/2020 |
| KR | 10-2021-0045698 A | 4/2021 |
| KR | 10-2023-0066927 A | 5/2023 |
| KR | 10-2023-0072219 A | 5/2023 |

\* cited by examiner

*Primary Examiner* — Ziaul Karim
(74) *Attorney, Agent, or Firm* — Quantum Patent Law Firm; Seongyoune Kang

(57) ABSTRACT

A method of predicting power generation using meta-learning includes: (a) receiving, by a main server, power generation data and weather data of one or more power plants; (b) scaling, by the main server, the power generation data using respective capacities of the one or more power plants; (c) scaling, by the main server, the weather data using maximum and minimum weather values during a predetermined period; (d) generating, by the main server, a weather-power generation input sequence using weather scaling data corresponding to a first past period and a prediction period that are continuous to each other, and power generation scaling data corresponding to a second past period that is longer than the first past period; and (e) inputting, by the main server, the weather-power generation input sequence into a power generation prediction model to acquire a power generation output sequence corresponding to the prediction period.

8 Claims, 3 Drawing Sheets

METHOD FOR PREDICTION POWER GENERATION USING META-LEARNING, DEVICE AND SYSTEM USING THE SAME

CROSS-REFERENCE TO RELATED APPLICATION

This application claims the benefit of and priority to Korean Patent Application No. 10-2023-0135140 filed on Oct. 11, 2023, which is herein incorporated by reference in its entirety.

FIELD OF THE INVENTION

The present disclosure relates to a method of predicting power generation using meta-learning, and a device and system using the same, and more particularly, to a method of predicting power generation capable of training the power generation of a plurality of power plants with only one prediction model in a meta-learning style to predict the generated power amounts of the power plants in various locations with only one model, performing learning using various power generation data and weather data to minimize overfitting and improve generalization performance, and predicting power generation with minimal data even for power plants that lack information, and a device and system using the same.

BACKGROUND OF INVENTION

AS climate change worsens and fossil fuels become scarcer, the demand for energy support such as solar and wind power is increasing. For solar and wind power, which are difficult to control in terms of timing and output, predicting the amount of generated power plays a crucial role in power grid planning. Traditionally, predicting power generation requires training individual models for each power plant, based on weather forecasts to anticipate future power output. However, this approach faces challenges: it cannot utilize the historical data of power plants in different regions, new power plants cannot deploy power generation prediction models until sufficient data is accumulated, and managing individual prediction models for each power plant is cumbersome.

Therefore, there is a growing necessity for a new meta-learning approach to power generation prediction. This method would enable predicting power generation for power plants located in different regions using a single model, perform predictions with minimal data even for newly installed power plants without accumulated data, and facilitate easier management of these prediction models.

SUMMARY OF THE INVENTION

An aspect of the present disclosure is to provide a method of predicting power generation capable of predicting the power generation of respective power plants with only a minimum amount of data using power generation data and weather data from a plurality of power plants installed in various regions, and more easily managing a power generation prediction system, and a device and system using the same.

The problems of the present disclosure are not limited to the above-mentioned problems, and other problems which are not mentioned herein will be clearly understood by those skilled in the art from the description below.

In order to solve the foregoing problems, a method of predicting power generation using meta-learning according to an embodiment of the present disclosure may include (a) receiving, by a main server, power generation data and weather data of one or more power plants, (b) scaling, by the main server, the power generation data using respective capacities of the one or more power plants, (c) scaling, by the main server, the weather data using maximum and minimum weather values during a predetermined period, (d) generating, by the main server, a weather-power generation input sequence using weather scaling data corresponding to a prediction period and a first past period, and power generation scaling data corresponding to a second past period that is longer than the first past period, and (e) inputting, by the main server, the weather-power generation input sequence into a power generation prediction model to acquire a power generation output sequence corresponding to the prediction period.

Specific matters of other embodiments are included in the detailed description and drawings.

According to the present disclosure as described above, it has various effects as follows.

The present disclosure may effectively predict the power generation of a plurality of power plants distributed in different regions with only one power generation prediction model.

In the present disclosure may predict the power generation of a new power plant with only minimum power generation data.

The present disclosure may minimize time and cost used for system management by using only one power generation prediction model.

The real-time temperatures and statuses of a respective plurality of measuring instruments included in a water and sewage monitoring controller may be checked, thereby allowing a control server to comprehensively manage the effective fire detection and water leak detection of a monitoring controller.

The effects according to the present disclosure are not limited to the description illustrated above, and further various effects are included in this specification.

The present application is supported by a Korea Agency for Infrastructure Technology Advancement (KAIA) grant funded by the Ministry of Land, Infrastructure and Transport (Grant. RS-2022-00143582).

DETAILED DESCRIPTION OF THE INVENTION

Figure 1:
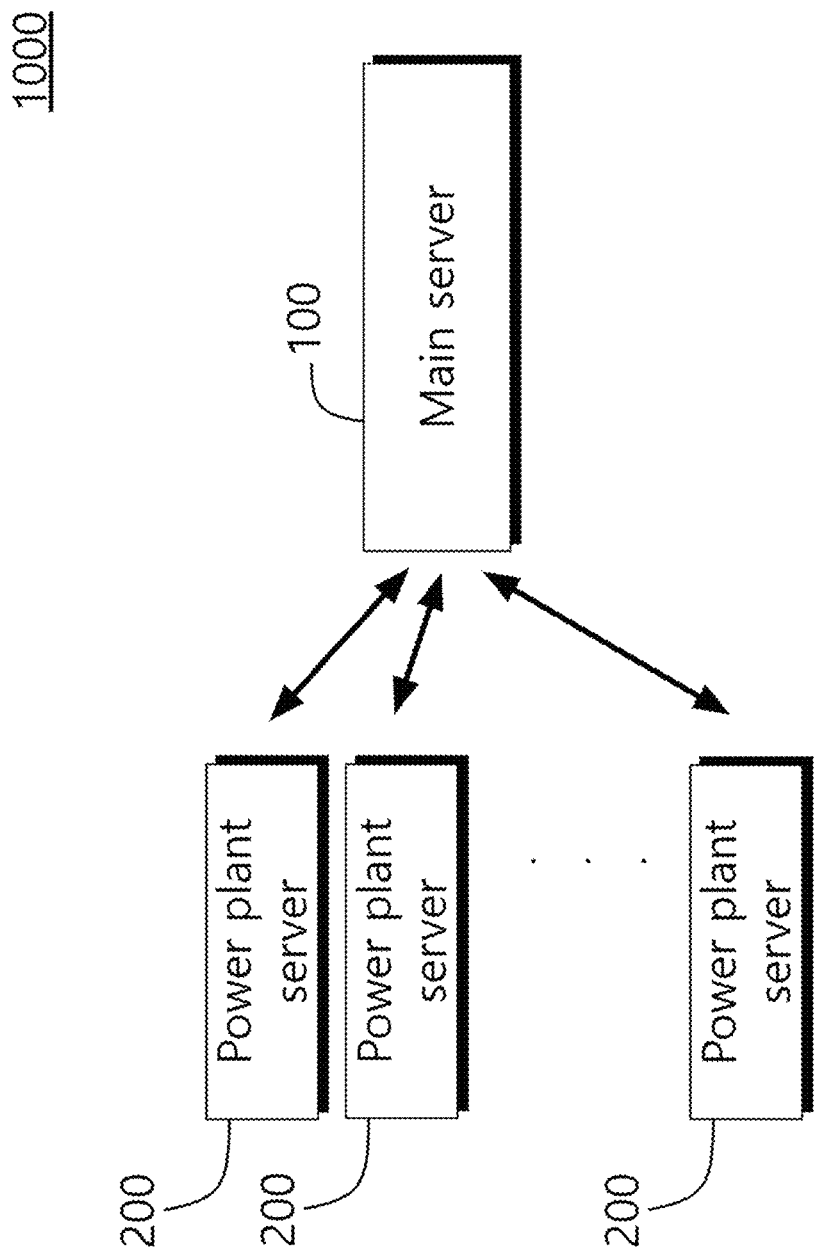
FIG. 1 is a schematic diagram of a power generation prediction system using meta-learning according to an embodiment of the present disclosure.

Hereinafter, various embodiments of the present disclosure will be described in detail with reference to the accompanying drawings. Advantages and features of the present disclosure and methods of accomplishing the same will be clearly understood with reference to the following embodiments described below in detail in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present disclosure is to be defined only by the scope of the appended claims.

The shapes, sizes, ratios, angles, numbers, and the like illustrated in the accompanying drawings for describing the embodiments of the present disclosure are merely illustrative, and thus, the present disclosure is not limited thereto. Like reference numerals refer to like elements throughout the specification. In addition, in describing the present disclosure, a detailed description of known related technologies will be omitted to avoid unnecessarily obscuring the subject matter of the present disclosure. In a case where the terms such as "including", "having", "comprising" and the like are used herein, other parts may be further added unless the term "only" is used. It will be understood that a singular expression of an element encompasses a plural expression of the element unless specifically stated otherwise.

In interpreting an element, it is construed that the interpretation includes an error range unless explicitly described otherwise separately.

In the case of a description regarding a location relation, for example, when a location relation between two parts is described using the terms "on", "above", "below", "next to", and the like, for example, one or more parts may be located between the two parts unless the term "immediately" or "directly" is used.

When an element or layer is disposed "on" the other element or layer, another layer or another element may be interposed directly on the other element or therebetween.

Although the terms first, second, and the like are used to describe various elements, the elements are not limited to those terms. These terms are merely used to distinguish one element from the other elements. Therefore, a first element mentioned below may also be a second element within the technical concept of the present disclosure.

Like reference numerals refer to like elements throughout the specification.

A size and thickness of each component illustrated in the drawings are shown for the sake of convenience of explanation, and the present disclosure is not necessarily limited to the size and thickness shown herein.

The respective features of various embodiments of the present disclosure may be partially or entirely coupled to or combined with one another, and as fully understood by those skilled in the art, such features may be technically linked or operated together in various ways, and the embodiments may be implemented independently of or in association with one another.

Figure 2:
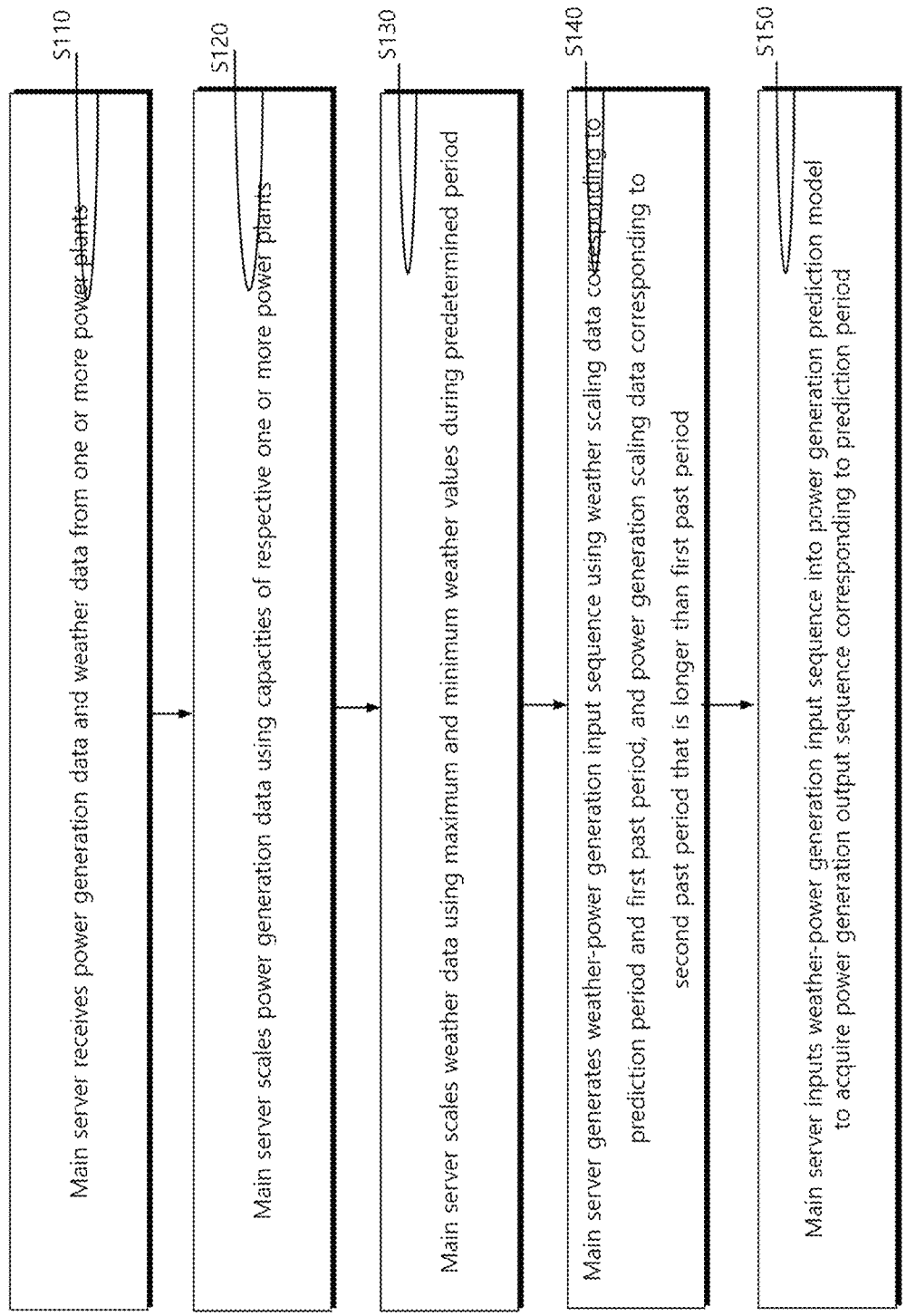
FIG. 2 is a flowchart for explaining a power generation prediction system using meta-learning according to an embodiment of the present disclosure.
Figure 3:
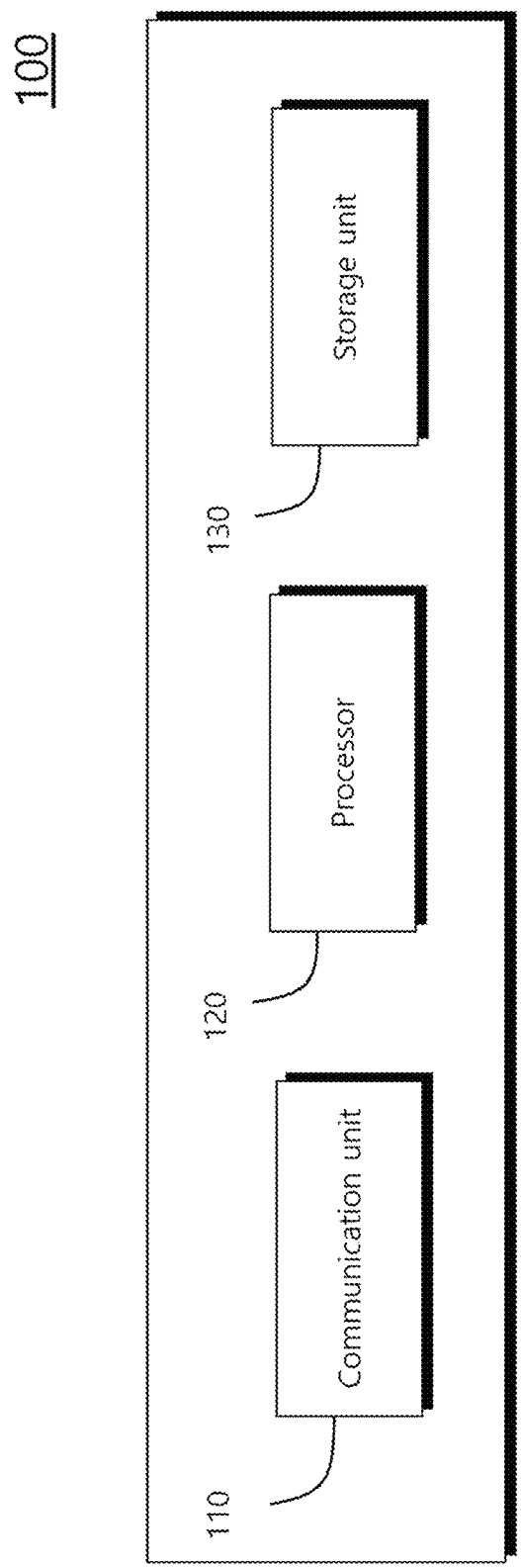
FIG. 3 is a schematic diagram of a main server of a power generation prediction system using meta-learning according to an embodiment of the present disclosure.

FIG. 1 is a schematic diagram of a power generation prediction system using meta-learning according to an embodiment of the present disclosure. FIG. 2 is a flowchart for explaining a power generation prediction system using meta-learning according to an embodiment of the present disclosure. FIG. 3 is a schematic diagram of a main server of a power generation prediction system using meta-learning according to an embodiment of the present disclosure.

Referring to FIGS. 1 to 3, a power generation prediction system 1000 using meta-learning is a system capable of training the power generation of a plurality of power plants with only one prediction model in a meta-learning style to predict the generated power amounts (e.g., solar or wind power, etc.) of the power plants in various locations. The power generation prediction system 1000 using meta-learning in the present disclosure may acquire data from power plants in various locations to facilitate data acquisition, and learn the prediction of power generation using a variety of data to minimize an overfitting problem that can be specialized and learned only for a specific problem during model learning, and therefore, there is an advantage capable of improving generalization performance, and predicting power generation with minimal data even for power plants that lack information. Specifically, the power generation prediction system 1000 using meta-learning may include, as element thereof, a plurality of power plant servers 200 and a main server 100.

The main server 100 of the power generation prediction system 1000 using meta-learning, which is a component that implements a power generation prediction method using meta-learning in the present disclosure, may refer to a power generation prediction device using meta-learning. The main server 100 may receive power generation data and weather data from a plurality of power plants, scale the power generation data using the respective capacities of the power plants, and scale the weather data using the maximum and minimum weather values. In addition, the main server 100 may generate a weather-power generation input sequence using weather scaling data and power generation scaling data, and input the weather-power generation input sequence into a power generation prediction model to generate a power generation output sequence corresponding to a desired period for predicting power generation. Furthermore, the capacity of the power plant may be scaled using the power generation output sequence, thereby generating the power generation of the power plant as a result. The main server 100 may include, as elements thereof, a communication unit 110, a processor 120, and a storage unit 130.

The communication unit 110 of the main server 100 is an element that communicates in real time with a plurality of power plant servers 200 to transmit and receive signals and data. The communication unit 110 may receive power generation data from a plurality of power plant servers 200, and may receive the weather data of the power plant from sensors installed in the power plants or weather stations closest to the power plants.

The processor 120 of the main server 100, which is an element that can process various signals and data, may train a power generation prediction model that can predict the power generation of power plants, and predict the power generation of a specific power plant in advance using the trained power generation prediction model. Specifically, the processor 120 may scale power generation data and weather data, and generate a weather-power generation input sequence using the scaled data including power generation scaling data and weather scaling data. In addition, the processor 120 may input the weather-power generation input sequence into the power generation prediction model to generate a power generation output sequence, thereby training the power generation prediction model and calculating the predicted power generation data of the desired power plant through the power generation prediction model. The learning and result calculation of the power generation prediction model performed by the processor 120 will be described in detail later with reference to FIG. 2.

The storage unit 130 of the main server 100 may be configured to store information such as various data received from other elements of the power generation prediction system 1000 using meta-learning, and data generated by the processor 120, for example, power generation data and weather data. In various embodiments, the storage unit 130 may include a storage medium having at least one type of a flash memory type, a hard disk type, a multimedia card micro type, a card type memory (e.g., SD or XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. In this embodiment, the main server 100 has been described as including the storage unit 130, but is not limited thereto, and the main server 100 may not include the entire storage unit 130 or part of the storage unit 130, and in this case, the power generation prediction system 1000 using meta-learning may include an external database separated from the main server 100. The external database may perform a function of the storage unit 130 in this embodiment, and may transmit and receive signals and data to and from the main server 100.

The power plant server 200 of the power generation prediction system 1000 using meta-learning may refer to a server installed in a power plant that produces power by various methods such as solar and wind power. The power plant server 200 may generate data on an amount of power (i.e., power generation) produced by the power plant in real time, and transmit the generated data to the main server 100. Additionally, when a sensor capable of generating weather data is installed in a power plant, the power plant server 200 may transmit the weather data of the power plant generated by the sensor to the main server 100.

Hereinafter, a method for predicting power generation using meta-learning performed by the main server 100 will be described in detail.

First, the main server 100 may receive power generation data and weather data from one or more power plants (S110). Specifically, the communication unit 110 of the main server 100 may receive generation power (amounts of power) produced by the respective plurality of power plants from the respective plurality of power plant servers 200 in real time or at regular intervals. For example, the communication unit 110 may receive power generation data from the respective plurality of power plant servers 200 at a regular interval of 1 hour or 15 minutes.

Furthermore, the communication unit 110 may receive weather data, which is data related to the weather of the respective plurality of power plants, from at least one of the plurality of power plant servers 200, sensors installed in the plurality of power plants, or weather stations closest to the plurality of power plants. The weather data may be a plurality of weather data, and in this case, the plurality of weather data may include at least one of temperature data, humidity data, cloud cover data, wind speed data, wind direction data, precipitation data, and snowfall data.

The power generation data and the weather data received by the communication unit 110 may be managed as one data set based on a time point t at which the data is generated. For example, when the power generation data is $y_{k,t}$ and the weather data is $x_{k,t}$ at a time point t in a power plant k, the processor 120 may generate a data set in the form of $\{(x_{k,t}, y_{k,t})\}_{t=1:T_k}$ and use the generated data set in order to use it in the power generation prediction model of the present disclosure. Here, $t=1:T_k$ may denote that a time point of acquisition of power generation data and weather data is from 1 to $T_k$. Here, t may gradually increase according to an interval of receiving power generation data and weather data. For example, if an interval in which power generation data and weather data are received is 1 hour, then t may increase by 1 from 1 to $T_k$.

Meanwhile, a time point within this specification may refer to a starting point of a period.

Subsequently, the main server 100 may scale power generation data using the capacities of respective one or more power plants (S120). The processor 120 of the main server 100 may scale power generation data received from the plurality of power plant servers 200 using the capacities of the respective plurality of power plants. The respective plurality of power plants may have different capacities, and the power generation of the power plants may be proportional to the capacities. Accordingly, the processor 120 may normalize and scale the power generation data by dividing the power generation by the capacities of the corresponding power plants. That is, the processor 120 may need to normalize respective power plants in consideration of the characteristics of generators themselves owned by the respective power plants distributed in different locations so as to predict the power generation of a general power plant, and to this end, power generation data may be normalized using the capacities of the respective power plants. The generation of power generation scaling data by the processor 120 may be performed using 'Equation 1' below. In Equation 1, $\tilde{y}_{t,k}$ is power generation scaling data at a time point t in a power plant k, and $C_k$ may refer to the capacity of the power plant k.

$$\tilde{y}_{t,k} = y_{t,k}/C_k \qquad \text{[Equation 1]}$$

Subsequently, the main server 100 may scale the weather data using maximum and minimum weather values during a predetermined period (S130). The processor 120 of the main server 100 may scale weather data using the maximum and minimum weather values, which are maximum and minimum values of the weather data, during a predetermined period, for example, for an entire period during which the weather data of the power plant is received. Such data scaling may be performed for the respective plurality of weather data described above. The weather data may have different data values and variation ranges depending on a difference in the type of data, that is, temperature data, humidity data, cloud cover data, wind speed data, and the like. The difference depending on the type of weather data may affect the learning of a power generation prediction model, and in consideration thereof, the processor 120 may scale the weather data.

Specifically, the processor 120 may perform min-max scaling on the weather data using maximum and minimum weather values during a predetermined period according to 'Equation 2' below. $\tilde{x}_{k,t}$ in 'Equation 2' may refer to scaled weather data (i.e. weather scaling data) at a time point t in a power plant k, M may refer to a maximum value of the weather data during a predetermined period, and m may refer to a minimum value of the weather data during the predetermined period.

$$\tilde{x}_{k,t} = \frac{x_{k,t} - m}{M - m} \qquad \text{[Equation 2]}$$

Subsequently, the main server 100 may generate a weather-power generation input sequence using weather scaling data corresponding to a prediction period and a first past period, and power generation scaling data corresponding to a second past period that is longer than the first past period (S140).

Specifically, the prediction period may refer to a period during which the power generation prediction model is to predict power generation, that is, a target period. The processor 120 may predict power generation during a prediction period using a power generation prediction model. The first past period is a period prior to the prediction period, and the first past period and the prediction period may be continuous. The second past period is a period prior to the prediction period, and a total duration of the prediction period and the first historical period may be equal to a total duration of the second past period. In addition, an end point of the second past period may be the same as an end point of the first past period, and an end point of the second past period may be the same as a start point of the prediction period.

For example, assume that a start time of the prediction period is a time point t, a length of the prediction period is 1 day, and a length of the first past period is 6 days. In this case, the first past period may be a period from 6 days prior to the time point t to the time point t, and the prediction period may be a period from the time point t to 1 day subsequent to the time point t. Furthermore, in this case, a length of the second past period may be 7 days, which is a sum of a length of the prediction period (1 day) and a length of the first past period (6 days), and the second past period may be a period from 7 days prior to the time point t to the time point t. Under such an assumption, the processor 120 of the main server 100 may generate a weather-power generation input sequence according to 'Equation 3' below.

Weather-power generation input sequence=$[(\tilde{x}_{k,t-144}, \tilde{y}_{k,t-168}),(\tilde{x}_{k,t-143},\tilde{y}_{k,t-167}), \ldots ,(\tilde{x}_{k,t},\tilde{y}_{k,t-24})\tilde{x}_{k,t+1}, \tilde{y}_{k,t-23}), \ldots ,(\tilde{x}_{k,t+23}\tilde{y}_{k,t-1})]$ [Equation 3]

Specifically, the weather-power generation input sequence may include a plurality of element data (portions enclosed in parentheses in Equation 3), and the respective element data may be formed by combining weather scaling data with power generation scaling data. For the plurality of element data constituting the weather-power generation input sequence, a time interval between adjacent element data may be set to 1 hour as shown in Equation 3. That is, t+1 may denote a time point at 1 hour subsequent to a time point t (a start point of the prediction period). However, the time interval between adjacent element data is not limited thereto, may be changed as needed, and may also be set to 15 minutes, for example.

That is, $(\tilde{x}_{k,t}, \tilde{y}_{k,t-24})(\tilde{x}_{k,t}, \tilde{y}_{k,t-24})$ in the weather-power generation input sequence is one element data constituting the weather-power generation input sequence, and the weather scaling data at a time point t in a power plant k and the power generation scaling data at a time point t-24 (i.e., 24 hours prior to the time point t) of power plant k may be combined into one element data.

Referring to the weather-power generation input sequence, for the weather scaling data, data $(\tilde{x}_{k,t}\tilde{x}_{k,t}$ to $\tilde{x}_{k,t+23}\tilde{x}_{k,t+23})$ from a time point t to 24 hours (1 day) subsequent to the time point t, and data $(\tilde{x}_{k,t-144}\tilde{x}_{k,t-144}$ to $\tilde{x}_{k,t-1}\tilde{x}_{k,t-1})$ from 144 hours (6 days) prior to a time point t to the time point t are used, which may refer to the data of the prediction period and the data of the first past period, respectively.

Furthermore, referring to the weather-power generation input sequence, for the power generation scaling data, data $(\tilde{y}_{k,t-168}\tilde{y}_{k,t-168}$ to $\tilde{y}_{k,t-1}\tilde{y}_{k,t-1})$ from 168 hours (7 days) prior to a time point t to the time point t is used, which may refer to the data of the second past period.

Here, respective element data constituting the weather-power generation input sequence may be generated by combining generation power scaling data that have been shifted back in time than a start time of the weather scaling data. In consideration of the weather-power generation input sequence in Equation 3, it can be seen that start points of the power generation scaling data in the respective element data are shifted back in time by 24 hours (1 day), which is a length of the prediction period (a difference between the second past period and the first past period) compared to start points of the weather scaling data. This is because an entire time section (the second past period) of the power generation scaling data is shifted back in time than an entire time section (the first past period and the prediction period) of the weather scaling data.

As described above, the processor 120 of the main server 100 may use weather characteristics (weather scaling model) and power generation characteristics (power generation scaling model) in the past to generate a weather-power generation input sequence through inputting a power generation scaling model shifted back in time according to an autoregressive model into respective element data. Accordingly, a causal relationship of the weather-power generation input sequence (i.e., a causal relationship between weather characteristics and power generation in the past) may be effectively learned by a power generation prediction model, thereby improving the accuracy of power generation prediction by the learned power generation prediction model.

More specifically, when training a power generation prediction model, the processor 120 of the main server 100 may use weather scaling data based on actual past weather data as weather scaling data corresponding to the prediction period of the weather-power generation input sequence. That is, all weather scaling data used in the learning process of the power generation prediction model may be actual observed data. In addition, when training a power generation prediction model, the processor 120 may use the actual power generation of the power plant corresponding to the prediction period as an output of the power generation prediction model.

In contrast, when predicting power generation using a power generation prediction model, the main server 100 may use weather scaling data based on weather forecasts as weather scaling data corresponding to the prediction period of the weather-power generation input sequence. That is, when the processor 120 predicts the power generation of a prediction period using the power generation prediction model, the prediction period may be a future time section and weather scaling data based on weather forecast data may be used. In this case, the processor 120 may acquire a power generation output sequence during the prediction period, which is a future time section, as an output of the power generation prediction model.

Subsequently, the main server 100 may input the weather-power generation input sequence into the power generation prediction model to acquire a power generation output sequence corresponding to the prediction period (S150). The processor 120 of the main server 100 may input the weather-power generation input sequence into the power generation prediction model and, in response thereto, acquire a power generation output sequence $[\tilde{y}_{k,t}\tilde{y}_{k,t+1}, \ldots , \tilde{y}_{k,t+23}]$ $[\tilde{y}_{k,t}\tilde{y}_{k,t+1}, \ldots , \tilde{y}_{k,t+23}]$ corresponding to the prediction period. The respective elements of the power generation output sequence may be in the form of power generation scaling data.

Subsequently, the main server 100 may multiply each data of the power generation output sequence by the respective capacities of the one or more power plants to acquire the power generation of the respective one or more power plants. The respective elements of the power generation output sequence may be normalized data that does not take into account the capacity of the power plant whose power generation is predicted, that is, power generation scaling data. Therefore, the processor 120 of the main server 100 may multiply the respective element data of the power generation output sequence by the capacity $C_kC_k$ of the power plant to acquire the predicted power generation of the power plant during the prediction period (a period from a time point t to a time point t+23).

According to one embodiment, in the step S120, the processor 120 of the main server 100 may extract a plurality of reference data, which are weather data at start points of the prediction periods of the respective plurality of weather data, generate a plurality of reference ranges for the respective plurality of weather data using the respective plurality of reference data, extract maximum past start points from among past periods corresponding to the plurality of reference ranges generated for the respective plurality of weather data, calculate an average start point of the maximum past start points of the respective plurality of weather data, and use the calculated average start point as a start point of the predetermined period of the step S120.

Specifically, in order to determine a start point of a predetermined period in step S120, the processor 120 may first set values at start points of the prediction periods of a respective plurality of weather data as a plurality of reference data. The plurality of weather data, as described above, may include at least one of temperature data, humidity data, cloud cover data, wind speed data, wind direction data, precipitation data, and snowfall data. For the respective plurality of weather data, the processor 120 may set the weather values at the start points of the prediction period to reference data of the respective plurality of weather data.

Subsequently, the processor 120 may generate reference ranges for the respective plurality of weather data using the reference data of the respective plurality of weather data. For example, in the case of temperature data among the plurality of weather data, a value of 20 degrees may be indicated at a start point of the prediction period, and the processor 120 may set a range of 15 degrees, which is 5 degrees less than 20 degrees, to 25 degrees, which is 5 degrees greater than 20 degrees, as the reference range of the temperature data. As described above, for the respective plurality of weather data, the processor 120 may determine a maximum value of the reference range by adding a specific weather value based on the reference data and determine a minimum value of the reference range by subtracting the specific weather value. Here, the added and subtracted weather values used to determine the maximum and minimum values of the reference range may be different for the respective plurality of weather data, and may be set or changed in advance by an administrator.

Subsequently, the processor 120 may generate past periods corresponding to a plurality of reference ranges generated for the respective plurality of weather data. Past data for the respective plurality of weather data may be stored in the storage unit 130 of the main server 100, and the processor 120 may extract only past data corresponding to the reference ranges for the past data of the respective plurality of weather data. The past data extracted for the respective plurality of weather data may have past periods corresponding thereto. For example, in the case of temperature data among the plurality of weather data, the reference range may be 15 to 25 degrees as in the example described above. The processor 120 may extract all past periods that have corresponded to the reference range (15 degrees to 25 degrees) using the past data of the weather data. In this manner, the processor 120 may extract past periods corresponding to the reference range for all the plurality of weather data.

Subsequently, the processor 120 may extract maximum past start points from among the past periods of the respective plurality of weather data, and extract an average start point of the extracted maximum past start points of the respective plurality of weather data. For example, the processor 120 may extract a maximum past start point, which is the most past start point among all past periods that have corresponded to the reference range of the weather data. In this manner, the processor 120 may extract maximum past start points for all the respective plurality of weather data. Furthermore, the processor 120 may calculate an average value of the maximum past start points of the respective plurality of weather data to extract an average start point.

Subsequently, the processor 120 may set the extracted average start point to a start point of the predetermined period in the step S130. As described above, the processor 120 may determine reference ranges using weather values at the start points of the prediction periods of the plurality of weather data, set maximum past start points using the determined reference ranges of the respective plurality of weather data, and set an average value of the maximum past start point as an average start point. Accordingly, the power generation prediction system 1000 using meta-learning in the present disclosure may generate maximum and minimum weather values using only weather data within a range similar to a value of the weather data at a start point of the prediction period other than all the weather data, and accordingly, in the scaling process of the weather data, use data having a high degree of similarity to the weather data in the prediction period, thereby improving the accuracy of power generation prediction.

According to one embodiment, the main server 100 may assign greater weights to respective plurality of element data constituting the weather-power generation input sequence as being closer to first element data including weather scaling data at a start point of the prediction period.

Specifically, the weather-power generation input sequence may include a plurality of element data, and the processor 120 may assign greater weights to other element data adjacent to the first element data $(\tilde{x}_{k,t}, \tilde{y}_{k,t-24})(\tilde{x}_{k,t}, \tilde{y}_{k,t-24})$ including the weather scaling data $\tilde{x}_{k,t}\tilde{x}_{k,t}$ at a start point of the prediction period among the plurality of element data as being closer to the first element data to perform power generation prediction. That is, at least part of the respective plurality of element data may have different weights so as to be utilized in the power generation prediction model. Here, as a degree of proximity to the first element data in the order of the weather-power generation input sequence increases, a weight utilized in the power generation prediction model of the element data may increase. Accordingly, the power generation prediction system 1000 using meta-learning in the present disclosure may perform power generation prediction by assigning a weight to element data at a start point adjacent to a start point of the prediction period, thereby further improving the accuracy of power generation prediction.

According to one embodiment, the main server 100 may proportionally increase the weights of the plurality of element data as being closer to the first element data. As described above, greater weights may be assigned to data adjacent to the first element data, and in this case, the processor 120 may improve the weights of the element data proportionally as the proximity to the first element data increases.

On the contrary, according to one embodiment, the main server 100 may increase the weights of the plurality of element data in accordance with an exponential function as being closer to the first element data.

On the contrary, according to one embodiment, the main server 100 may increase the weights of the plurality of element data in accordance with a logarithmic function as being closer to the first element data.

According to one embodiment, the main server 100 may assign a greater weight to past element data than to future element data compared to first element data. The processor 120 of the main server 100 may set the weights of the past element data $[(\tilde{x}_{k,t-144}, \tilde{y}_{k,t-168}) (\tilde{x}_{k,t-144}, \tilde{y}_{k,t-168})$ to $(\tilde{x}_{k,t-1}, \tilde{y}_{k,t-25})(\tilde{x}_{k,t-1}, \tilde{y}_{k,t-25})]$ to be greater than those of the future element data $[(\tilde{x}_{k,t+1}, \tilde{y}_{k,t-23})(\tilde{x}_{k,t+1}, \tilde{y}_{k,t-23})$ to $(\tilde{x}_{k,t+23}, \tilde{y}_{k,t-1})(\tilde{x}_{k,t+23}, \tilde{y}_{k,t-1})]$ compared to the first element data $(\tilde{x}_{k,t}, \tilde{y}_{k,t-24})(\tilde{x}_{k,t}, \tilde{y}_{k,t-24})$ so as to be utilized in the power generation prediction model. Here, the weather scaling data of the future element data may be weather scaling data based on weather forecasts. The power generation prediction system 1000 using meta-learning in the present disclosure may set the weights of the future element data corresponding to the weather forecasts to be lower than those of the past element data corresponding to actual weather values so as to apply the weights corresponding to the accuracy of the data, thereby further improving the accuracy of power generation prediction.

One or more of various embodiments of the present disclosure may, of course, be combined with one another to form a new embodiment.

A method of predicting power generation using meta-learning according to various embodiments of the present disclosure may include (a) receiving, by a main server, power generation data and weather data of one or more power plants, (b) scaling, by the main server, the power generation data using respective capacities of the one or more power plants, (c) scaling, by the main server, the weather data using maximum and minimum weather values during a predetermined period, (d) generating, by the main server, a weather-power generation input sequence using weather scaling data corresponding to a prediction period and a first past period, and power generation scaling data corresponding to a second past period that is longer than the first past period, and (e) inputting, by the main server, the weather-power generation input sequence into a power generation prediction model to acquire a power generation output sequence corresponding to the prediction period.

According to another feature of the present disclosure, the step (b) may further include dividing, by the main server, the power generation data by the respective capacities of the one or more power plants to normalize and scale the power generation data.

According to still another feature of the present disclosure, the step (c) may further include performing, by the main server, min-max scaling on the weather data using the maximum and minimum weather values during a predetermined period to scale the weather data.

According to yet still another feature of the present disclosure, a total duration of the prediction period and the first past period may be equal to a total duration of the second past period.

According to still yet another feature of the present disclosure, the first past period and the prediction period may be continuous, and an end point of the first past period and an end point of the second past period may be the same.

According to yet still another feature of the present disclosure, respective element data constituting the weather-power generation input sequence may be generated by combining the weather scaling data at a specific time point and the power generation scaling data shifted back in time by a difference between the second past period and the first past period at the specific time point.

According to still yet another feature of the present disclosure, subsequent to the step (e), the main server may further include multiplying each data of the power generation output sequence by the respective capacities of the one or more power plants to acquire the respective power generation of the one or more power plants.

According to yet still another feature of the present disclosure, the main server, when training the power generation prediction model, may use weather scaling data based on past weather data as weather scaling data corresponding to the prediction period, and the main server, when predicting power generation using the power generation prediction model, may use the weather scaling data based on weather forecasts as weather scaling data corresponding to the prediction period.

According to still yet another feature of the present disclosure, the weather data may be a plurality of weather data including at least one of temperature data, humidity data, cloud cover data, wind speed data, wind direction data, precipitation data, and snowfall data, and in the step (c), the main server may extract a plurality of reference data, which are weather data at start points of the prediction periods of the respective plurality of weather data, generate a plurality of reference ranges for the respective plurality of weather data using the respective plurality of reference data, extract maximum past start points from among past periods corresponding to the plurality of reference ranges generated for the respective plurality of weather data, calculate an average start point of the maximum past start points of the respective plurality of weather data, and set the calculated average start point to a start point of the predetermined period.

According to yet still another feature of the present disclosure, the step (e) may include assigning, by the main server, greater weights to respective plurality of element data constituting the weather-power generation input sequence as being closer to first element data including weather scaling data at a start point of the prediction period.

According to still yet another feature of the present disclosure, the main server may assign a greater weight to past element data than to future element data compared to first element data.

According to yet still another feature of the present disclosure, the step (e) may include proportionally increasing, by the main server, the weights of the plurality of element data as being closer to the first element data.

According to still yet another feature of the present disclosure, the step (e) may include increasing, by the main server, the weights of the plurality of element data in accordance with an exponential function as being closer to the first element data.

According to yet still another feature of the present disclosure, the step (e) may include increasing, by the main server, the weights of the plurality of element data in accordance with a logarithmic function as being closer to the first element data.

A device of predicting power generation using meta-learning according to various embodiments of the present disclosure may include a communication unit configured to receive, from at least one of one or more power plant servers, meteorological offices, and weather sensors, power generation data of the one or more power plants, and weather data, a storage unit configured to store the power generation data and the weather data, and a processor configured to scale the power generation data using the respective capacities of the one or more power plants, scale the weather data using maximum and minimum weather values during a predetermined period, generate a weather-power generation input sequence using weather scaling data corresponding to a prediction period and a first past period, and power generation scaling data corresponding to a second past period that is longer than the first past period, and input the weather-power generation input sequence into a power generation prediction model to acquire a power generation output sequence corresponding to the prediction period.

A system of predicting power generation using meta-learning according to various embodiments of the present disclosure may include one or more power plant servers that generate at least one of power generation data and weather data, and a power generation prediction device using meta-learning, wherein the power generation prediction device includes a communication unit configured to receive, from at least one of the one or more power plant servers, meteorological offices, and weather sensors, the power generation data and the weather data, a storage unit configured to store the power generation data and the weather data, and a processor configured to scale the power generation data using the respective capacities of the one or more power plants, scale the weather data using maximum and minimum weather values during a predetermined period, generate a weather-power generation input sequence using weather scaling data corresponding to a prediction period and a first past period, and power generation scaling data corresponding to a second past period that is longer than the first past period, and input the weather-power generation input sequence into a power generation prediction model to acquire a power generation output sequence corresponding to the prediction period.

In the above, the present disclosure has been described with specific matters such as detailed elements and limited embodiments and drawings, but such a description is only provided to help a more general understanding of the present disclosure, and the present disclosure is not limited to the above embodiments, and it will be apparent to those skilled in the art that various changes and modification can be made based on the description herein.

Accordingly, the concept of the present disclosure should not be limited to the above-described embodiments, and the following claims as well as all equivalents or modifications thereof are intended to fall within the scope of the concept of the disclosure.

REFERENCE NUMERALS

1000: Power generation prediction system using meta-learning
100: Main server
110: Communication unit
120: Processor
130: Storage unit
200: Power plant server

What is claimed is:

1. A method of predicting power generation using meta-learning, the method comprising:
   (a) receiving, by a main server, power generation data and weather data of one or more power plants;
   (b) scaling, by the main server, the power generation data using respective capacities of the one or more power plants to generate power generation scaling data;
   (c) scaling, by the main server, the weather data using maximum and minimum weather values during a predetermined period to generate weather scaling data;
   (d) generating, by the main server, a weather-power generation input sequence using the weather scaling data corresponding to a first past period and a prediction period that are continuous to each other, and the power generation scaling data corresponding to a second past period that is longer than the first past period; and
   (e) inputting, by the main server, the weather-power generation input sequence into a power generation prediction model to acquire a power generation output sequence corresponding to the prediction period; and
   (f) operating a given power plant, other than the one or more power plants, according to the power generation output sequence acquired in the step (e),
   wherein respective element data constituting the weather-power generation input sequence are generated by combining the weather scaling data at a specific time point with the power generation scaling data at a time point prior to the specific time point,
   wherein a length of the second past period is equal to a sum of the first past period and the prediction period, and an end point of the second past period is equal to a start point of the prediction period,
   wherein the step (e) comprises assigning, by the main server, greater weights to the weather-power generation input sequence as being closer to first element data including weather scaling data at the start point of the prediction period,
   wherein the weather data is a plurality of different types of weather data, and
   wherein, prior to the step (c), the main server is configured to generate the respective plurality of weather data at the start point of the prediction period as a plurality of reference data, generate a plurality of reference ranges for the respective plurality of weather data with respect to the plurality of reference data, extract all past periods corresponding to the plurality of reference ranges for the plurality of weather data, generate a plurality of maximum past start points for all the past periods for the respective plurality of weather data, calculate an average value of the plurality of maximum past start points, and set the calculated average value as the start point of the predetermined period in the step (c).

2. The method of claim 1, wherein the plurality of weather data comprises at least one of temperature data, humidity data, cloud cover data, wind speed data, wind direction data, precipitation data, and snowfall data.

3. The method of claim 1, wherein the step (e) comprises: assigning, by the main server, a greater weight to past element data than to future element data compared to the first element data.

4. The method of claim 1, wherein the step (e) comprises: proportionally increasing, by the main server, the weights of the plurality of element data as being closer to the first element data.

5. The method of claim 1, wherein the step (e) comprises: assigning, by the main server, a greater weight to past element data than to future element data compared to the first element data.

6. The method of claim 1, wherein the step (e) comprises: increasing, by the main server, the weights of the plurality of element data in accordance with a logarithmic function as being closer to the first element data.

7. A device of predicting power generation using meta-learning, the device comprising circuitry configured to:

receive, from at least one of one or more power plant servers, meteorological offices, and weather sensors, power generation data of the one or more power plants, and weather data;

store the power generation data and the weather data; and scale the power generation data using the respective capacities of the one or more power plants, scale the weather data using maximum and minimum weather values during a predetermined period, generate a weather-power generation input sequence using weather scaling data corresponding to a first past period and a prediction period that are continuous to each other, and power generation scaling data corresponding to a second past period that is longer than the first past period, input the weather-power generation input sequence into a power generation prediction model to acquire a power generation output sequence corresponding to the prediction period, and operate a given power plant, other than the one or more power plants, according to the acquired power generation output sequence, wherein respective element data constituting the weather-power generation input sequence are generated by combining the weather scaling data at a specific time point with the power generation scaling data at a time point prior to the specific time point, wherein a length of the second past period is equal to a sum of the first past period and the prediction period, and an end point of the second past period is equal to a start point of the prediction period, wherein the weather data is a plurality of different types of weather data, wherein the processor is configured to:

acquire the power generation output sequence, assign greater weights to the weather-power generation input sequence as being closer to first element data including weather scaling data at a start point of the prediction period to acquire the power generation output sequence; and generate the respective plurality of weather data at a start point of the prediction period as a plurality of reference data, generate a plurality of reference ranges for the respective plurality of weather data with respect to the plurality of reference data, extract all past periods corresponding to the plurality of reference ranges for the plurality of weather data, generate a plurality of maximum past start points for all the past periods for the respective plurality of weather data, calculate an average value of the plurality of maximum past start points, and set the calculated average value as a start point of the predetermined period.

8. A system of predicting power generation using meta-learning, the system comprising:

one or more power plant servers configured to generate at least one of power generation data and weather data, and a power generation prediction device configured to use meta-learning, wherein the power generation prediction device comprises circuitry configured to:

receive, from at least one of the one or more power plant servers, meteorological offices, and weather sensors, the power generation data and the weather data;

store the power generation data and the weather data; and scale the power generation data using the respective capacities of the one or more power plants, scale the weather data using maximum and minimum weather values during a predetermined period, generate a weather-power generation input sequence using weather scaling data corresponding to a first past period and a prediction period that are continuous to each other, and power generation scaling data corresponding to a second past period that is longer than the first past period, input the weather-power generation input sequence into a power generation prediction model to acquire a power generation output sequence corresponding to the prediction period, and operate a given power plant, other than the one or more power plants, according to the acquire power generation output sequence, wherein respective element data constituting the weather-power generation input sequence are generated by combining the weather scaling data at a specific time point with the power generation scaling data at a time point prior to the specific time point, wherein a length of the second past period is equal to a sum of the first past period and the prediction period, and an end point of the second past period is equal to a start point of the prediction period, wherein the weather data is a plurality of different types of weather data, gad wherein the processor is configured to:

acquire the power generation output sequence, assign greater weights to the weather-power generation input sequence as being closer to first element data including the weather scaling data at a start point of the prediction period to acquire the power generation output sequence; and generate the respective plurality of weather data at a start point of the prediction period as a plurality of reference data, generate a plurality of reference ranges for the respective plurality of weather data with respect to the plurality of reference data, extract all past periods corresponding to the plurality of reference ranges for the plurality of weather data, generate a plurality of maximum past start points for all the past periods for the respective plurality of weather data, calculate an average value of the plurality of maximum past start points, and set the calculated average value as a start point of the predetermined period.

* * * * *